Figure 1:
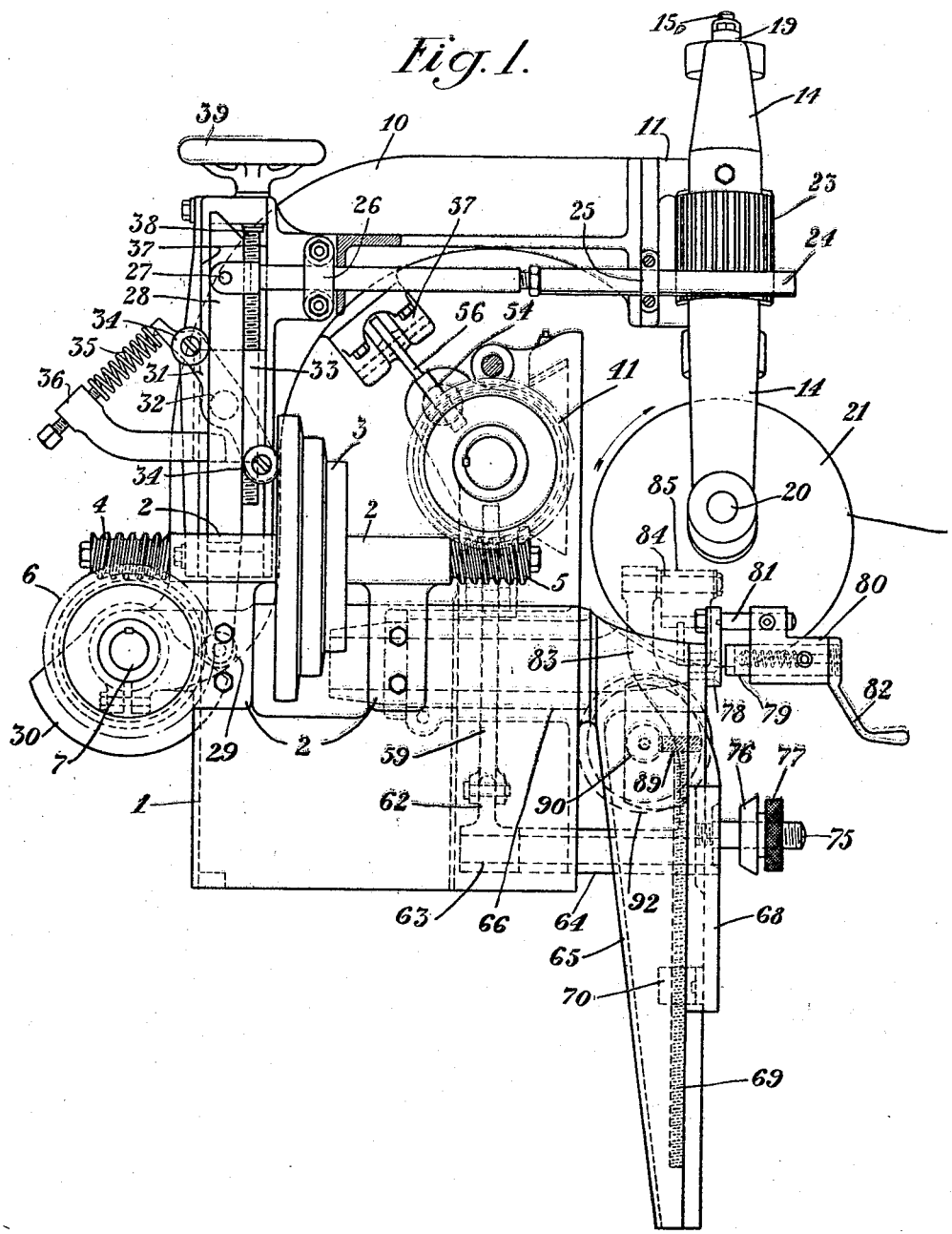

July 15, 1924.

J. O. LIFFLANDER 1,501,564

MACHINE FOR GRINDING SAW TEETH AND THE LIKE

Filed July 13, 1922     4 Sheets-Sheet 1

INVENTOR:
JOHAN OSCAR LIFFLANDER
By George Bayard Jones atty

July 15, 1924.     1,501,564
J. O. LIFFLANDER
MACHINE FOR GRINDING SAW TEETH AND THE LIKE
Filed July 13, 1922     4 Sheets-Sheet 3

INVENTOR:
JOHAN OSCAR LIFFLANDER
By George Bayard Jones
Atty.

July 15, 1924.

J. O. LIFFLANDER 1,501,564

MACHINE FOR GRINDING SAW TEETH AND THE LIKE

Filed July 13, 1922    4 Sheets-Sheet 4

INVENTOR
JOHAN OSCAR LIFFLANDER
By George Bayard Jones atty.

Patented July 15, 1924.

1,501,564

UNITED STATES PATENT OFFICE.

JOHAN OSCAR LIFFLANDER, OF STOCKHOLM, SWEDEN, ASSIGNOR TO J. & C. G. BOLINDERS MEKANISKA VERKSTADS AKTIEBOLAG, OF STOCKHOLM, SWEDEN, A COMPANY OF SWEDEN.

MACHINE FOR GRINDING SAW TEETH AND THE LIKE.

Application filed July 13, 1922. Serial No. 574,688.

*To all whom it may concern:*

Be it known that I, JOHAN OSCAR LIFFLANDER, a subject of the King of Sweden, residing at Stockholm, in the Kingdom of Sweden, have invented a new and useful Improvement in Machines for Grinding Saw Teeth and the like, of which the following is a specification.

The present invention relates to a machine for grinding saw teeth and the like of the kind which is provided with means for producing movement relatively to one another of a rotary grinding disk with its support or frame and of a holder or the like for the saw blade to be ground, and with feeding means for successively feeding the saw blade. For the purposes of the invention it is of no importance whether the rotary grinding disk with its support is movable towards a stationary holder for the saw blade, or whether said last mentioned holder is moved during operation together with the saw blade towards and away from a rotary grinding disk which always occupies the same position, although the first named arrangement is probably most used and most feasible in practice.

The invention is broadly characterized by this that the means for producing relative movement of the grinding disk and the saw blade relatively to one another, and the feeding means are connected with and actuated by a driving means by means of an adjustment device operable during the operation of the machine, which device is so constructed that in all positions of adjustment the movements of each of said means for effecting relative movement and said feeding means start from a limit position common to all movements of each means and are proportional to one another and to the corresponding movements of the other means. In this manner the advantage is attained that if the machine is adjusted for a certain tooth profile it is possible by means of a single adjustment of the adjustment device simultaneously to attain such regulation of the movement of the grinding disk towards and away from the saw blade, or in other words the grinding feed, as well as of the feed of the saw teeth that the profile is retained and only the pitch is altered.

The adjustment device may suitably consist of levers or the like movably journalled in an adjustable slide or the like, said levers engaging with and transmitting motion from the driving means to the feeding means and to the means for producing movement of the grinding disk relatively to the saw blade, and the slide being movable in such manner that on adjustment of the same the length of the effective arms of the levers is simultaneously altered.

The holder for the saw blade suitably consists of a slide which is reciprocable on a slide support which is pivotally journalled in the machine frame in such manner that it is capable of rotating in a plane parallel to that of a saw blade secured in the slide. By this means it is possible by turning the slide support to adjust said support and the slide for grinding different cutting angles on the saw blade secured in the slide. The slide support is suitably journalled in the machine frame by means of a hollow trunnion so that a suction conduit may be applied to the same for removing the grinding dust.

The grinding disk is movable towards and away from the holder for the saw blade in a direction which forms an angle with the plane of the grinding disk. By this arrangement only the edge of the grinding disk will contact with the saw blade, and thus not any of the plane faces of the grinding disk, so that said faces will not be worn and deformed which would cause the saw teeth to become deformed during the grinding.

The shaft of the grinding disk is journalled in a frame which is capable of turning on a spindle perpendicular to said shaft, the axis of said spindle being suitably located in the plane of the grinding disk. The purpose of this arrangement is that the machine shall be adapted for grinding cross cutting saw blades the teeth of which are provided with bevelled cutting edges. The frame with the grinding disk is turned into one position for grinding one edge of the saw tooth, and afterwards it is turned into another position for grinding the other edge.

Figure 2:
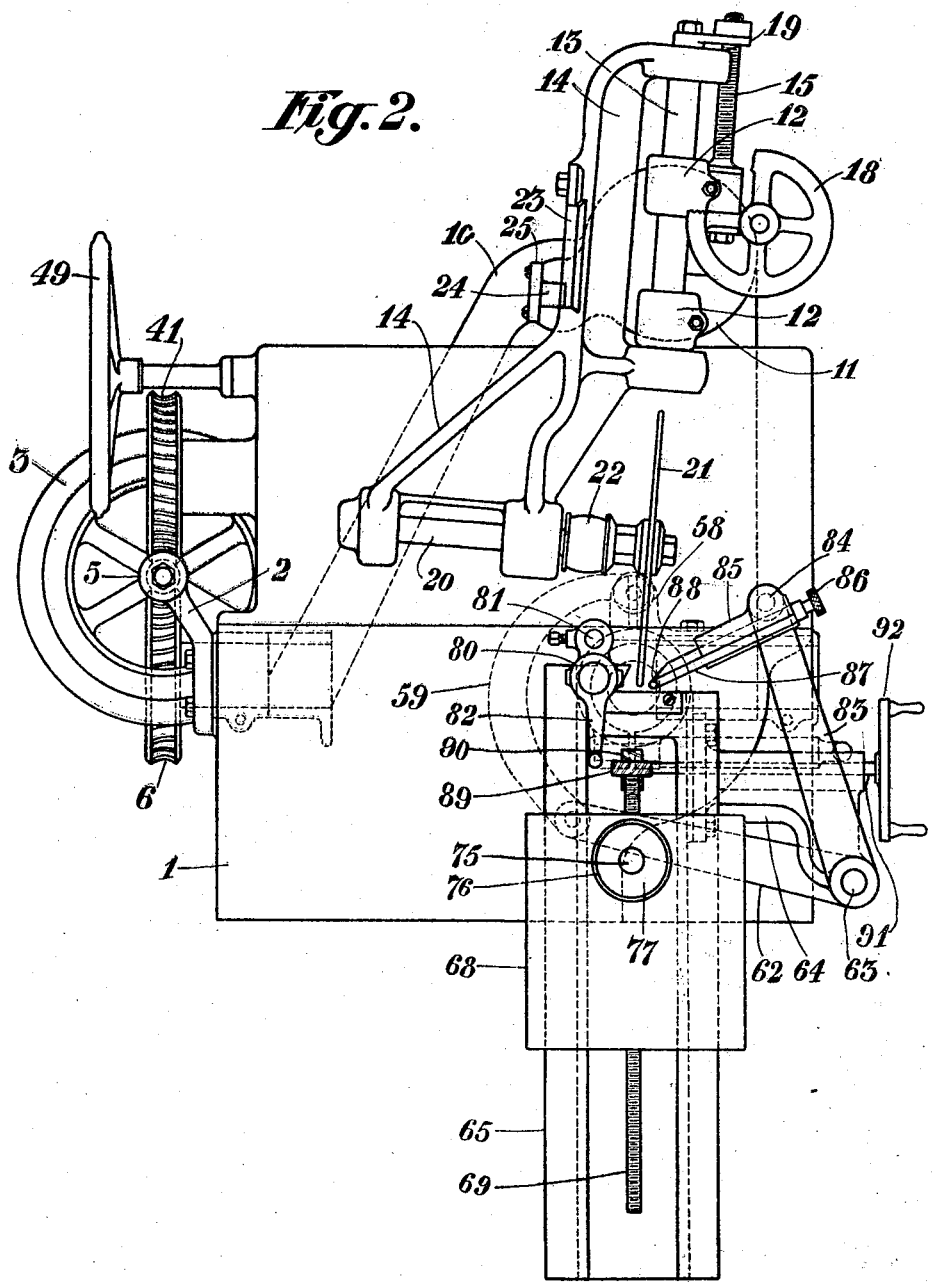

In the accompanying drawings an embodiment of a grinding machine according to the present invention is illustrated. Fig. 1 shows the machine viewed from one end, Fig. 2 shows the front side of the machine, Fig.

Figure 4:
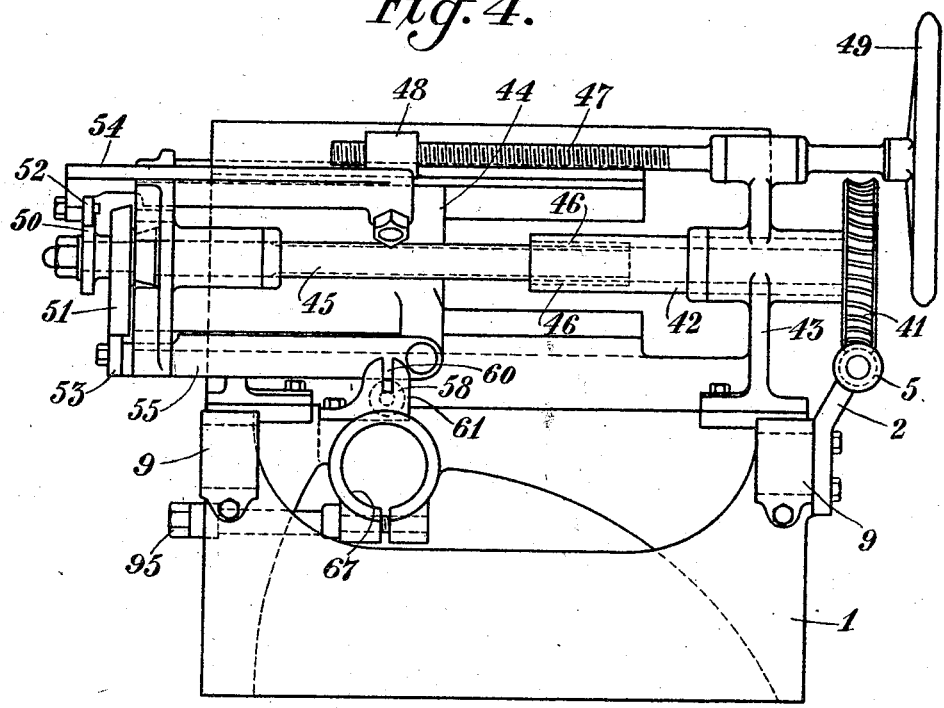

3 shows the machine viewed from the other end, and Fig. 4 shows the rear side of the machine, the swinging support for the grinding disk being removed.

The machine illustrated consists of a base frame 1 to which bearings 2 for the driving shaft are attached, said shaft carrying the driving step pulley 3. The driving shaft is provided at each end outside the bearings 2 with screw worms 4 and 5, the worm 4 being single-threaded and the worm 5 being double-threaded.

Figure 3:
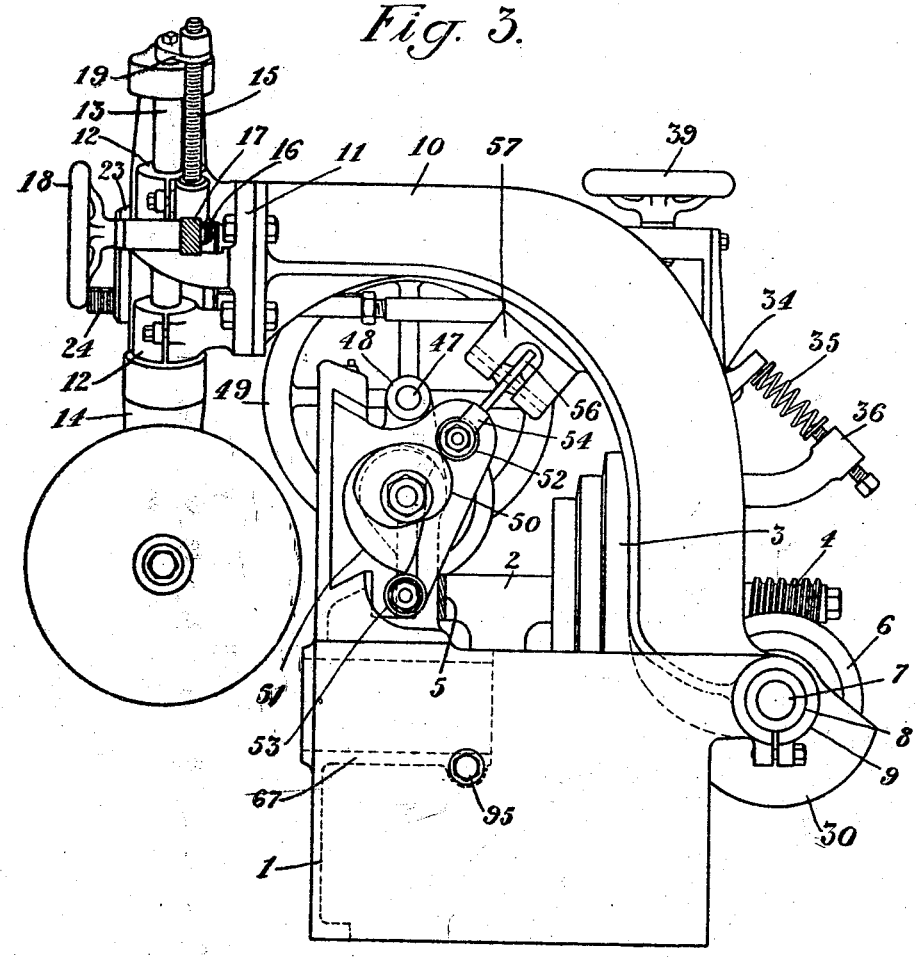

The worm 4 engages with a worm wheel 6 mounted on a shaft 7 journalled in bushings 8 which are clamped in slitted bearings 9 on the base frame 1, as shown in Figs. 3 and 4. The frame or support 10 is rotatably journalled on said bushings. At the upper end of said support there is secured a head 11 having bearings 12 for a shaft or spindle 13 which is secured in a frame 14. A screw 15 is journalled in the head 11 and is geared by means of a worm gearing 16, 17 to a hand wheel 18, so that said screw 15 may be turned by means of said hand wheel 18. The screw 15 is threaded into a part 19 which is secured to the spindle 13, so that when said screw 15 is turned in the one or the other direction by means of the hand wheel 18, the spindle or shaft 13 will be moved up or down in the bearings 12, so that thus the frame 14 will be raised or lowered. The shaft 20 of the grinding disk 21 is journalled in the lower portion of the frame 14 at right angles to the shaft or spindle 13, so that the axes of said shaft 20 and spindle 13 are located in the same plane. The grinding disk 21 is mounted on the shaft 20 in such manner that its plane goes through the axis of the spindle 13. A pulley 22 is mounted on the shaft 20 by means of which pulley and a belt, not shown in the drawing, rotary motion is transmitted to the grinding disk 21. In the embodiment illustrated the axis of rotation of the support 10 is horizontal and coincides with the axis of the shaft 7, so that when said support is turned on said axis the parts supported by the same will swing in vertical planes. The spindle 13 does not lie in such a vertical plane, however, its axis forming an angle of suitably about 85° to the axis of rotation of the support 10, for purposes further to be explained here below.

A toothed arc or segment 23 is secured to the frame 14 and meshes with a toothed rack 24 which is slidably supported in the head 11 at 25 and in the support 10 at 26. The toothed rack 24 is pivotally connected at 27 with a lever 28 which supports at its lower end a roller 29 which bears against a cam disk 30 on the shaft 7. The fulcrum of the lever 28 is adjustable, the lever being embraced by a yoke 31 which is pivotally secured at 32 to a slide 33 and is provided with rollers 34 bearing against either side of the lever 28 and pressed against said lever by a spring 35, which is inserted between the yoke 31 and an arm 36 on the slide 33. Said slide is movable in guides 37 on the support 10, and may be moved up and down by means of a screw 38 having a hand wheel 39. It will be understood that in the positions of the parts shown in Fig. 1 the lever 28 will turn on the fulcrum 32 when the roller 29 moves over the cam disk 30 during the rotation of the shaft 7, so that the pin 27 and thus also the toothed rack 24 will move to and fro, owing to which the spindle frame 14 will oscillate on the spindle 13. Again, if the slide 33 be moved upwards by means of the hand wheel 39 and the screw 38 so far that the fulcrum 32 of the yoke 31 will be practically in alignment with the pin 27, said latter pin will of course remain stationary during the movement of the roller 29 over the cam disk 30, so that thus the reciprocating movement of the toothed rack 24 and thus also the oscillating movement of the spindle frame 14 cease.

The worm 5 on the driving shaft engages with a worm wheel 41 which has the same diameter and number of teeth as the worm wheel 6, but the worm 4 being single-threaded and the worm 5 being double-threaded the worm wheel 41 will obviously rotate twice as fast as the worm wheel 6. The worm wheel 41 is secured to a shaft 42 which is journalled in a slide support 43 attached to the bottom frame 1. The slide 44, Fig. 4, is movable in said slide support 43 in horizontal direction parallelly to the shaft 7 and thus to the axis of rotation of the support 10. The shaft 42 is hollow and embraces the shaft 45 which is journalled in the slide 44. The shafts 42 and 45 are slidably connected by means of keys 46, so that the shaft 45 may slide in the shaft 42 when the slide 44 is moved in the slide support 43, whereas said shafts 42 and 45 will always rotate in unison. The displacement of the slide 44 in the slide support 43 is effected by means of the screw 47, which is threaded into a lug 48 on the slide 44, and which may be turned by means of the hand wheel 49, Fig. 4. Two exchangeable cam disks 50 and 51 are secured to the shaft 45, against which disks rollers 52 and 53 bear, said rollers being journalled in the outer ends of two levers 54 and 55 which are pivoted in the slide 44 and which are guided in said slide 44 adjacent their outer ends. The cam disks 50 and 51 are so proportioned, that when the rollers 52 and 53 bear against the largest radii of said cam disks, the edges of the levers 54 and 55 remote from the shaft 45 are horizontal and thus parallel to the shaft 45 and to the direction of movement of the slide, for the purpose further explained here below.

A roller 56 bears against the upper or outer edge of the lever 54, said roller being journalled in a bearing 57 secured to the support 10 and thus supporting said support.

A roller 58, Figs. 2 and 4, bears against the lower surface of the lever 55, said roller being journalled in the upper end of a link 59, Fig. 2, and the turning pin of said roller being guided in vertical slots 60 in a guide 61 secured to the bottom frame 1, Fig. 4. The lower end of the link 59 is pivotally connected with the outer end of an arm 62 secured to a shaft 63 which is journalled in a bearing 64. Said arm 62 is actuated by a spring not shown in the drawing, or in other suitable manner, so that it tends to turn upwards and thus to maintain the roller 58 in contact with the lever 55. The bearing 64 is secured to one side of a slide support 65, which is provided with a hollow trunnion 66 by means of which it is rotatably journalled in a slitted bearing 67 in the bottom frame 1, in which bearing 67 the slide support 65 may be locked in any desired position by means of the screw 95, Figs. 3 and 4. A slide 68 is adapted to be moved on the slide support 65 by means of a screw 69 which passes through a lug 70 on the slide. A worm wheel 89 is mounted on the upper end of the screw 69, said wheel 89 meshing with a worm wheel 90 which is mounted on a shaft 91 which may be turned by means of a hand wheel 92, Fig. 2. The slide 68 is provided with a stud 75 on which the saw blade to be ground is mounted, after which said blade is clamped against the slide 68 by means of a conical washer 76, which is introduced into the opening in the saw blade, and by tightening the nut 77 on the stud 75. The periphery of the saw blade is held during the grinding against an abutment 78 secured to the slide support 65, by a blade press which consists of a presser foot 79 which is actuated by a spring and slides in a holder 80 which is adjustably secured to the stud 81 attached to the abutment 78. The presser foot may be retracted from the saw blade against the pressure of the spring by means of the crank 82 which is screwed on the threaded outer end of the pressure foot and bears against the outer end of the holder 80.

An arm 83 is secured to the shaft 63, preferably at an angle of approximately 60° to the arm 62, said arms being suitably of equal length. A holder 85 is pivoted on a stud 84 at the outer end of said arm 83, said holder carrying a feeding pawl 87 adjustable by means of the screw 86 and provided with a lateral finger 88 adapted to engage the teeth of the saw blade.

The trunnion 66 of the slide support 65 is hollow, so that a suction conduit may be easily applied to its inner end for the purpose of removing the dust formed during the grinding, as will be easily understood.

If it is desired to grind a longitudinally cutting or re-sawing blade on the machine, the blade is mounted on the stud 75 on the slide 68 inside the washer 76 and inside the presser foot 79, after which the slide 68 is moved on the slide support 65 until the blade arrives at the proper height. The support 10 being rotatable on a horizontal shaft, all points on the same and thus also on the grinding disk 21 will move in vertical planes, and for this reason the slide support 65 is adjusted in such manner that the straight front edge of the tooth on the blade becomes vertical. Before the saw blade is secured and adjusted the machine should have been stopped in such position that the rollers 52 and 53 on the levers 54 and 55 bear against the outermost portions of the peripheries of the cams 50 and 51, so that the upper and lower surfaces of said levers are parallel with the shaft 45, that is to say, horizontal. The support 10 and thus also the grinding disk 21 now occupy their highest or most raised positions, and the feed pawl finger 88 occupies its most forward position. It will therefore be understood that the said positions will always be the same irrespective of the adjustment or location of the slide 44, because in the said horizontal positions of the levers 54 and 55 said levers will not actuate the support 10 and the roller 58 in the link 59 when the slide is moved. The feeding pawl finger 88 will thus, quite independently of the adjustment of the slide 44, always feed the tooth forward to the same position irrespective of whether the feed has been changed for another pitch of the saw blade. Further, the grinding disk will always be in the same starting position with its axis of rotation in the plane of the saw blade, owing to which fact the point of the saw tooth will always be ground at right angles to the side planes of the blade, so that there can be no injurious grinding askew.

When the machine is started in operation the levers 54 and 55 will of course follow the cams 50 and 51. The cams used when grinding re-sawing blades are such that the finger 88 will be rapidly retracted and engage the next saw tooth, and, while the saw blade is stationary, the support 10 moves downwards together with the grinding disk 21 which grinds the straight face edge of the tooth. The grinding disk being inclined to the vertical direction, only the edge of the grinding disk will touch the edge of the saw tooth, so that the grinding disk will not be worn on its plane surface, as it would be if said surface were in engagement with the saw tooth in which case the grinding disk would eventually be deformed and in its turn deform the saw tooth.

The feeding pawl finger 88 will now move the saw blade forward, and simultaneously the support 10 with the grinding disk 21 is raised, at first comparatively rapidly during the grinding of the inner portion of the back edge, and afterwards a little more slowly during the grinding of the outer portion of the back edge up to the point of the tooth, when the cycle is completed and the grinding of the next tooth begins. During the grinding of the outer portion of the back edge the grinding disk approaches the upper or starting position, in which its axis of rotation is directly above the saw blade, so that the said portion of the back edge will be ground at right angles to the side faces of the saw blade.

If the grinding disk has been worn to a small diameter, or if it has been replaced by another grinding disk, adjustment is effected by means of the hand wheel 18, by means of which the frame 14 may be moved up and down parallelly with the plane of the grinding disk. By this means the grinding disk may be so positioned that the lower grinding edge of said disk will always be in the same position during the grinding.

If it is desired to change the feed for another pitch of the teeth of the saw blade it is only necessary by means of the hand wheel 49 to move the slide 44 in such manner that the roller 56 in the support 10 and the roller 58 in the link 59 come farther from or closer to the fulcra of the levers 54 and 55. The stroke or range of movement of said levers being always the same, it will be understood that the movements of the support 10 and the link 59 will be changed and thus also the up and down movement of the grinding disk 21 and the reciprocating movement of the feeding pawl finger 88. In this manner a simultaneous adjustment of the up and down movement of the grinding disk 21 and of the feeding of the saw blade is thus attained. As explained above the adjustment of the grinding disk is effected by means of the hand wheel 18, and the feeding pawl 87, 88 is adjusted by means of the screw 86, and the saw blade by means of the hand wheel 92.

The dust formed during the grinding is sucked away through the hollow trunnion 66.

When the machine is used in the manner above described for grinding re-sawing blades the slide 33, which supports the yoke 31 for the lever 28, is positioned at such height that the fulcrum 32 of the yoke 31 is practically in alignment with the pin 27 which connects the lever 28 with the toothed rack 24, so that the turning movement of the lever 28 under the influence of the cam disk 30 will not be transmitted to the toothed segment 23 and the frame 14, but said frame will remain in its intermediate position in which the plane of the grinding disk 21 is perpendicular to the plane of the saw blade.

The grinding of cross cutting saw blades in the machine is effected in substantially similar manner. The blade is secured to the slide 68, which is moved to the proper height. The slide support 65 is adjusted approximately vertically. The slide 33 is adjusted by means of the hand wheel 39 in such manner that the upper end of the lever 29 will be oscillated by the cam disk 30 sufficiently for producing the required turning of the frame 14 of the grinding disk 21 for grinding the cutting edges of the saw blade teeth, for instance 15° or 20° to either side of the intermediate position. The turning of the frame 14 must be comparatively rapid, and it might therefore cause too great stresses on the movable parts, and for this reason the yielding arrangement of the movable fulcrum of the lever 28 has been provided. The spring 35 will take up the initial pressure, when the machine is started and the frame shall swing inwards towards the machine, after which the spring expands and transmits the motion to the frame, and afterwards moves the frame back and turns it outwards when the roller 29 on the lever 28 runs down from the cam 30.

When the machine is used for grinding cross cutting saw blades cam disks 50 and 51 of such shape are used that when the machine is started from the position in which the levers 54 and 55 are horizontal, the support 10 with frame 14 and grinding disk 21 will at first remain in their upper positions, the grinding disk 21 rotating right above the point of the tooth. Simultaneously, the frame 14 and the grinding disk 21 are turned by the cam disk 30, as above described, and during the same period the feeding finger 88 is retracted for engaging the next tooth. The frame 14 and the grinding disk 21 remain in the position in which they have been turned, while the support 10 and thus also the grinding disk 21 now descend, while the saw tooth is simultaneously fed forward, until the grinding disk has reached the bottom of the space between the saw teeth, after which the grinding disk is moved upwards while the feeding of the saw blade is continued. During this period the front edge of one tooth and the rear edge of the next tooth have been ground. The support 10 will now remain stationary in its upper position during a short period during which the frame 14 and the grinding disk 21 are turned in the other direction by the cam 30, and the feeding finger 88 is retracted for engaging the next tooth, after which the grinding operation is continued in the manner above described. The adjustment of the frame 14 for different diameters of the grinding disk, and the adjustment of the feeding finger 88, are effected in the same manner as above described, and the adjustment of the feed of the grinding disk and of the feeding finger for different pitches of the teeth of the saw blade is also effected in the same manner by moving the slide 44 by means of the hand wheel 49.

It will be understood that it is possible to use a cam 30 which is so formed that the frame 14 will be turned or oscillated more or less also during the actual grinding operation, if desired.

It will be understood that also in other respects the invention is not limited to the embodiment above described and illustrated in the drawings, but that it is capable of various modifications. For instance, the levers 54 and 55 with the cooperating cam disks might be replaced by conical cams against which the rollers 56 and 58 would bear. Said levers might also be journalled in the machine frame and the cams 50 and 51 be adjustable in relation to said levers, and other similar modifications may be made.

I claim:

1. In a machine for grinding saw teeth and the like, the combination of a rotary grinding disk, a holder for the saw blade to be ground, means for producing movement relatively to one another of said grinding disk and said holder, means for successive feeding of the saw blade, driving means, and means adjustable during the operation of the machine for transmitting motion from said driving means to said movement producing means and said feeding means in such manner that on adjustment the movements of each of said two last-mentioned means are simultaneously altered in the same proportion.

2. In a machine for grinding saw teeth and the like, the combination of a rotary grinding disk, a holder for the saw blade to be ground, means for producing relative movement between said grinding disk and said holder, means for successive feeding of the saw blade, driving means, and means adjustable during the operation of the machine for transmitting motion from said driving means to said movement producing means and said feeding means in such manner that on adjustment the movements of each of said two last-mentioned means are simultaneously altered in the same proportion, said motion transmitting means consisting of an adjustable slide, and levers movable in said slide and actuated by said driving means, said levers engaging so as to transmit motion to said movement producing means and said feeding means, said slide being movable in such manner that on adjustment of the same the lengths of the active arms of said levers are simultaneously altered.

3. In a machine for grinding saw teeth and the like, the combination of a rotary grinding disk, a holder for the saw blade to be ground, means for producing movement relatively to one another of said grinding disk and said holder, means for successive feeding of the saw blade, driving means, and an adjustment device operable during the operation of the machine and adapted to transmit motion from said driving means to said movement producing means and said feeding means in such manner that in all positions of adjustment of said device the movements of each of said two last-mentioned means start from a limit position common to all movements of each means and are proportional to each other and to the corresponding movements of the other means.

4. In a machine for grinding saw teeth and the like, the combination of a rotary grinding disk, a holder for the saw blade to be ground, means for producing relative movement between said grinding disk and said holder, means for successive feeding of the saw blade, driving means, and an adjustment device operable during the operation of the machine and adapted to transmit motion from said driving means to said movement producing means and said feeding means in such manner that in all positions of adjustment of said device the movements of each of said two last-mentioned means start from a limit position common to all movements of each means and are proportional to each other and to the corresponding movements of the other means, said device consisting of a movable slide, levers journaled in said slide so as to be capable of occupying positions parallel to the direction of movement of said slide, and cam disks rotatably journaled in said slide and driven by said driving means, said cam disks supporting said levers and having such shapes that when supported on the outermost points on the same said levers occupy positions parallel to the direction of movement of said slide, said levers engaging so as to transmit motion to said movement producing means and to said feeding means.

5. In a machine for grinding saw teeth and the like, the combination of a rotary grinding disk, a holder for the saw blade to be ground, means for producing movement relatively to one another of said grinding disk and said holder, means for successive feeding of the saw blade, driving means, and an adjustment device comprising an adjustable slide, and levers movably journalled in said slide, said levers being actuated to move by said driving means and being in engagement with so as to transmit movement to said movement-producing means and said feeding means, said slide being movable in such manner that on adjustment of the same the lengths of the active arms of said levers are simultaneously altered.

6. In a machine for grinding saw teeth and the like, the combination of a rotary grinding disk, a holder for the saw blade to be ground, means for producing movement relatively to one another of said grinding disk and said holder, means for successive feeding of the saw blade, driving means, and an adjustment device comprising an adjustable slide, cam disks rotatably journalled in said slide and driven by said driving means, levers movably journalled in said slide and bearing against and actuated by said cam disks, said cam disks being of such shape that in one position of the same said levers occupy positions parallel to the direction of movement of said slide, and said levers engaging with so as to transmit motion to said movement producing means and said feeding means.

7. In a machine for grinding saw teeth and the like, the combination of a rotary grinding disk, a holder for the saw blade to be ground, means for producing movement relatively to one another of said grinding disk and said holder, means for successive feeding of the saw blade, a driving shaft, and an adjustment device comprising an adjustable slide, a shaft journalled in said slide and coupled to said driving shaft and capable of sliding longitudinally relatively to the same, cam disks on said second shaft, levers movably journalled in said slide and bearing against and actuated by said cam disks, said cam disks being of such shape that in one position of the same said levers occupy positions parallel to the direction of movement of said slide, and said levers engaging so as to transmit movement to said movement producing means and said feeding means.

8. In a machine for grinding saw teeth and the like, the combination of a frame, a rotary grinding disk, a holder for the saw blade to be ground, means for producing movement relatively to one another of said grinding disk and said holder, means for successive feeding of the saw blade, driving means, an adjustment device operable during the operation of the machine and adapted to transmit motion from said driving means to said movement producing means and said feeding means in such manner that in all positions of adjustment of said device the movements of each of said two last-mentioned means start from a limit position common to all movements of each means and are proportional to each other and to the corresponding movements of the other means, said holder for the saw blade comprising a slide, means for securing a saw blade to said slide, and a support for said slide, and means whereby said support is rotatably journalled in said frame in such manner that said support may rotate in a plane parallel to that of a saw blade secured in said slide.

9. In a machine for grinding saw teeth and the like, the combination of a frame, a rotary grinding disk, a holder for the saw blade to be ground, means for producing movement relatively to one another of said grinding disk and said holder, means for successive feeding of the saw blade, driving means, an adjustment device operable during the operation of the machine and adapted to transmit motion from said driving means to said movement producing means and said feeding means in such manner that in all positions of adjustment of said device the movements of each of said two last-mentioned means start from a limit position common to all movements of each means and are proportional to each other and to the corresponding movements of the other means, said holder for the saw blade comprising a slide, means for securing a saw blade to said slide, a support for said slide, and a hollow trunnion on said support extending perpendicularly to the path of movement of said slide on said support, and a bearing in said frame for said support.

10. In a machine of the class described, the combination of a grinding disk, a saw holder, means for producing movement of one of said members relatively to the other, saw feeding means, driving means, and means for transmitting motion from said driving means to both said movement producing and saw feeding means, said means for transmitting motion comprising levers and a slide, said slide being adjustable in such manner that the active arms of said levers are simultaneously altered.

11. In a machine for grinding saw teeth and the like, the combination of a rotary grinding disk, a holder for the saw blade to be ground, means for producing movement relatively to one another of said grinding disk and said holder, said grinding disk being so positioned that its plane forms an angle with the direction of said relative movement between said disk and said holder, means for successive feeding of the saw blade, driving means, and an adjustment device operable during the operation of the machine and adapted to transmit motion from said driving means to said movement producing means and said feeding means in such manner that in all positions of adjustment of said device the movements of each of said two last-mentioned means start from a limit position common to all movements of each means and are proportional to each other and to the corresponding movements of the other means.

12. In a machine for grinding saw teeth and the like, the combination of a rotary grinding disk, a shaft for said disk, a frame in which said shaft is journalled, a spindle on which said frame is rotatable and adjustable in the longitudinal direction thereof, said spindle forming right angles with said shaft, a holder for the saw blade to be ground, means for producing movement relatively to one another of said grinding disk and said holder, means for successive feeding of the saw blade, driving means, and an adjustment device operable during the operation of the machine and adapted to transmit motion from said driving means to said movement producing means and said feeding means in such manner that in all positions of adjustment of said device the movements of each of said two last-mentioned means start from a limit position common to all movements of each means and are proportional to each other and to the corresponding movements of the other means.

13. In a machine for grinding saw teeth and the like, the combination of driving means, a rotary grinding disk, a shaft for said disk, a frame in which said shaft is journalled, a spindle on which said frame is rotatable, said spindle forming right angles with said shaft, a toothed segment on said frame concentric with said spindle, a toothed rack meshing with said toothed segment, a cam disk driven by said driving means, a lever connected with said rack and actuated by said cam disk, a holder for the saw blade to be ground, means for producing movement relatively to one another of said grinding disk and said holder, means for successive feeding of the saw blade, and an adjustment device operable during the operation of the machine and adapted to transmit motion from said driving means to said movement producing means and said feeding means in such manner that in all positions of adjustment of said device the movements of each of said two last-mentioned means start from a limit position common to all movements of each means and are proportional to each other and to the corresponding movements of the other means.

14. In a machine for grinding saw teeth and the like, the combination of driving means, a rotary grinding disk, a shaft for said disk, a frame in which said shaft is journalled, a spindle on which said frame is rotatable, said spindle forming right angles with said shaft, a toothed segment on said frame concentric with said spindle, a toothed rack meshing with said toothed segment, a cam disk driven by said driving means, a lever connected with said rack and actuated by said cam disk, a slide movable and adjustable approximately in the longitudinal direction of said lever, means whereby said lever is journalled on said slide, a holder for the saw blade to be ground, means for producing movement relatively to one another of said grinding disk and said holder, means for successive feeding of the saw blade, and an adjustment device operable during the operation of the machine and adapted to transmit motion from said driving means to said movement producing means and said feeding means in such manner that in all positions of adjustment of said device the movements of each of said two last-mentioned means start from a limit position common to all movements of each means and are proportional to each other and to the corresponding movements of the other means.

15. In a machine for grinding saw teeth and the like, the combination of driving means, a rotary grinding disk, a shaft for said disk, a frame in which said shaft is journalled, a spindle on which said frame is rotatable, said spindle forming right angles with said shaft, a toothed segment on said frame concentric with said spindle, a toothed rack meshing with said toothed segment, a cam disk driven by said driving means, a lever connected with said rack and actuated by said cam disk, a slide movable and adjustable approximately in the longitudinal direction of said lever, a yoke journalled on said lever, rollers on said yoke on either side of said lever, a spring tending to turn said yoke so as to force said rollers against said levers, a holder for the saw blade to be ground, means for producing movement relatively to one another of said grinding disk and said holder, means for successive feeding of the saw blade, and an adjustment device operable during the operation of the machine and adapted to transmit motion from said driving means to said movement producing means and said feeding means in such manner that in all positions of adjustment of said device the movements of each of said two last-mentioned means start from a limit position common to all movements of each means and are proportional to each other and to the corresponding movements of the other means.

16. In a machine for grinding saw teeth and the like, the combination of a rotary grinding disk, a holder for the saw blade to be ground, means for producing movement relatively to one another of said grinding disk and said holder, said grinding disk being so positioned that its plane forms an angle with the direction of said relative movement between said disk and said holder, a shaft for said disk, a frame in which said shaft is journaled, a spindle parallel with the plane of said grinding disk and on which said frame is rotatable and adjustable in the longitudinal direction thereof, means for successive feeding of the saw blade, driving means, and an adjustment device operable during the operation of the machine and adapted to transmit motion from said driving means to said movement producing means and said feeding means in such manner that in all positions of adjustment of said device the movements of each of said two last mentioned means start from a limit position common to all movements of each means and are proportional to each other and to the corresponding movements of the other means.

JOHAN OSCAR LIFFLANDER.